United States Patent
Feiste et al.

(10) Patent No.: US 12,204,902 B2
(45) Date of Patent: Jan. 21, 2025

(54) ROUTING INSTRUCTION RESULTS TO A REGISTER BLOCK OF A SUBDIVIDED REGISTER FILE BASED ON REGISTER BLOCK UTILIZATION RATE

(71) Applicant: International Business Machines Corporation, Armonk, NY (US)

(72) Inventors: Kurt A. Feiste, Austin, TX (US); Brian W. Thompto, Austin, TX (US); Susan E. Eisen, Round Rock, TX (US); Salma Ayub, Austin, TX (US); Dung Q. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 17/464,227

(22) Filed: Sep. 1, 2021

(65) Prior Publication Data

US 2023/0068637 A1    Mar. 2, 2023

(51) Int. Cl.
*G06F 9/30* (2018.01)
*G06F 9/38* (2018.01)
*G06F 11/30* (2006.01)

(52) U.S. Cl.
CPC .......... *G06F 9/3012* (2013.01); *G06F 9/3854* (2023.08); *G06F 9/3858* (2023.08); *G06F 11/30* (2013.01)

(58) Field of Classification Search
CPC ...... G06F 9/3012; G06F 9/384; G06F 9/3857; G06F 9/50; G06F 11/30
See application file for complete search history.

(56) References Cited

U.S. PATENT DOCUMENTS 5,949,045 A    9/1999  Ezawa et al.
7,634,621 B1 *  12/2009  Coon .................... G06F 9/3012
                                                    711/149

(Continued)

FOREIGN PATENT DOCUMENTS

CN    103716324 B    4/2017
WO    02037219 A2    5/2002

OTHER PUBLICATIONS

Balasubramonian, R.,et al., "Reducing the Complexity of the Register File in Dynamic Superscalar Processors", Proceedings. 34th ACM/IEEE International Symposium on Microarchitecture, MICRO-34, Dec. 1-5, 2001, 12 pages.

(Continued)

*Primary Examiner* — David J. Huisman
(74) *Attorney, Agent, or Firm* — Scully, Scott, Murphy & Presser, P.C.

(57) ABSTRACT

A system, processor, programming product and/or method for assigning instructions to destination register file blocks, and/or routing instructions, includes: providing a processing pipeline having two or more execution units configured to process instructions; providing a register file having register file entries configured to hold data, where the register file is subdivided into a plurality of register blocks and each register block has two or more register file entries; calculating a utilization rate for one or more register blocks; and assigning and/or routing an instruction to write its results to a register block based upon the utilization rate for that register block. Preferably the execution unit is configured to write its results to a single specific destination (rename) register block.

15 Claims, 8 Drawing Sheets

(56) References Cited

U.S. PATENT DOCUMENTS

| | | |
|---|---|---|
| 10,127,554 B2 | 11/2018 | Russell et al. |
| 2006/0195707 A1* | 8/2006 | Rychlik .............. G06F 9/30123 712/E9.023 |
| 2010/0145836 A1 | 6/2010 | Baker et al. |
| 2014/0013085 A1* | 1/2014 | Vats ...................... G06F 9/3012 712/217 |
| 2015/0032624 A1 | 1/2015 | Claridge et al. |
| 2017/0300323 A1* | 10/2017 | Pattnaik .................. G06F 11/30 |
| 2019/0236458 A1 | 8/2019 | Taylor et al. |
| 2019/0340615 A1 | 11/2019 | Hanis et al. |
| 2020/0175518 A1 | 6/2020 | Chu et al. |
| 2020/0319923 A1* | 10/2020 | Ro ........................ G06F 3/0659 |
| 2021/0013386 A1 | 1/2021 | Zeng et al. |
| 2021/0133488 A1 | 5/2021 | Harris et al. |
| 2021/0133489 A1 | 5/2021 | Harris et al. |
| 2021/0133490 A1 | 5/2021 | Harris et al. |
| 2021/0133586 A1 | 5/2021 | Harris et al. |
| 2021/0133644 A1 | 5/2021 | Harris et al. |
| 2021/0133751 A1 | 5/2021 | Harris et al. |
| 2021/0133752 A1 | 5/2021 | Harris et al. |
| 2021/0133771 A1 | 5/2021 | Harris et al. |
| 2021/0133772 A1 | 5/2021 | Harris et al. |
| 2021/0133783 A1 | 5/2021 | Harris et al. |
| 2021/0133892 A1 | 5/2021 | Harris et al. |

OTHER PUBLICATIONS

Anonymous, "Method for reducing communications in a clustered processor by means of occupancy-aware steering", IP.com Electronic Publication Date: Aug. 17, 2005, 5 pages, IP.com No. IPCOM000127017D.

Anonymous, "Method for datapath-width sensitive instruction steering and a CP policy for heterogeneous clustered processors", IP.com Electronic Publication Date: Jun. 30, 2006, 6 pages, IP.com No. IPCOM000137919D.

Anonymous, "A Methodology for Effective Insertion of Software Instruction Prefetchs for Return Branch Predictions", IP.com Electronic Publication Date: Nov. 23, 2012, IP.com No. IPCOM000223699D.

* cited by examiner

ROUTING INSTRUCTION RESULTS TO A REGISTER BLOCK OF A SUBDIVIDED REGISTER FILE BASED ON REGISTER BLOCK UTILIZATION RATE

BACKGROUND OF INVENTION

The present invention generally relates to data processing systems, processors, and processor architecture, and methods of routing instructions in a system, processor and/or circuitry.

Processors currently used in data processing systems process more than one instruction at a time, and often process those instructions out-of-order. In modern computer architecture, there are several known ways to design a computer adapted to perform more than one instruction at a time, or at least in the same time frame. For example, one design to improve throughput includes multiple execution slices within a processor core to process multiple instruction threads at the same time, with the threads sharing certain resources of the processor core. An execution slice may refer to multiple data processing hardware pipelines connected in parallel within a processor to process multiple instructions concurrently. Pipelining involves processing instructions in stages, so that multi-stage pipelines maintain the same throughput as a single stage pipeline on multi-cycle instructions. Multiple execution slices may be used as part of simultaneous multi-threading within a processor core.

The various pipelined stages may include an "instruction fetch" stage where an instruction is fetched from memory. In a "decode" stage, the instruction may be decoded into different control bits, which in general designate a type of functional unit (e.g., execution unit) for performing the operation specified by the instruction, and source operands for the operation. In a "dispatch" stage, the decoded instruction is dispatched to an issue queue (ISQ) where instructions wait for data and an available execution unit. An instruction in the issue queue typically is issued to an execution unit in an "execution" stage. The "execution" stage processes the operation as specified by the instruction. Executing an operation specified by an instruction typically includes accepting data, e.g., one or more operands, and producing one or more results. The results are usually written to one or more register files. Register files typically hold data for and/or receive data from the execution units. Register files typically have information read from and/or written to entries or locations in the register file. In one or more embodiments, register files can be subdivided into blocks or banks such that execution units are assigned specific blocks or banks to which they write their results.

In processors with multiple execution units in an execution slice or pipeline, during operations one or more register blocks or banks can become full or nearly full, while other register blocks or banks are under-utilized. In other words, some register blocks or banks may be overloaded and/or over utilized while other register blocks or banks are lightly loaded and/or under-utilized. When a register block or bank is full or nearly full, the processor can stall resulting in delay and latency. It would be advantageous if the various register blocks or banks could be better balanced, e.g., the number of used register entries in the register blocks or banks is more equally distributed, which could improve processor performance and/or decrease latency.

SUMMARY

The summary of the disclosure is given to aid understanding of a computer system, computer architectural structure, processor, processor architecture structure, functional units, register files, and method of processing instructions in a processor, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, processor architecture structure, functional units, register files, and/or their method of operation to achieve different effects.

A computer system, processor, programming product, and/or method for processing information is disclosed for assigning and/or routing instructions in the system and/or processor, and in an embodiment is directed to balancing the register file entries between register blocks or banks, for example between STF blocks in a processor. In an aspect, the system, processor and/or method is directed to assigning and/or routing the write back of execution unit results to register file blocks in the system and/or processor. A system, processor, programming product and/or method for assigning instructions destination register file blocks, and/or routing instructions, according to one or more embodiments includes: providing a processing pipeline having two or more execution units configured to process instructions; providing a register file having a plurality of register file entries configured to hold data, wherein the register file is subdivided into a plurality of register blocks, and each register block has two or more register file entries; calculating a utilization rate for one or more register blocks; and routing an instruction to write its results to a register block based upon the utilization rate for the register block. In an approach, calculating the utilization rate for the register block includes: determining a usage rate of the register block; and comparing the usage rate of the register block to a threshold. The threshold according to an aspect is at least one of a group consisting of: a fixed number or percentage, a preset number or percentage, a predetermined number or percentage, a predefined number or percentage, an adjustable number or percentage, and a programable number or percentage. Determining a usage rate of the register block includes in an embodiment determining at least one of a group consisting of: the number of register entries in use in the register block, the number of register entries that are available for use in the register block, a percentage of register entries in use in the register block, and a percentage of register entries not in use in the register block. In one or more approaches, if the utilization rate for the register block is above a number or percentage, then the instruction is assigned to write its results to a first register block; and if the utilization rate for the register block is equal to or less than the number or the percentage, then the instruction is assigned to write its results to a second different register block. In an aspect, each execution unit is configured to write its results to a single specific register block.

The system, processor, programming product and/or method according to an embodiment further includes: calculating a utilization rate for each register block; and using the utilization rate of a register block while selecting the register block to assign to receive the results of the instruction. In another approach, the system, processor, programming product, and/or method further includes assigning a register block to the instruction; calculating a utilization rate for the register block assigned to the instruction; and determining whether the register block assigned to the instruction is over-utilized, wherein determining whether the register block assigned to the instruction is over-utilized includes comparing the utilization rate calculated for the register block assigned to the register block to a threshold, and if the utilization rate for the register block assigned to the instruction is over the threshold, then the register block assigned to the instruction is over-utilized. In a further aspect, the system, processor, programming product, and/or method further includes: determining whether the register file has an available register entry; associating, in response to the register file having an available register entry, an initial register block to the instruction without using the utilization rate for the initial register block associated with the instruction; and checking, using the utilization rate for the initial register block associated with the instruction, the initial register block associated with the instruction. Checking the initial register block associated with the instruction in an embodiment includes: adjusting, in response to the initial register block associated with the instruction being over-utilized, the initial register block associated with the instruction and assigning a different register block; and assigning, in response to the initial register block associated with the instruction not being over-utilized, the initial register block associated with the instruction. In a further approach, assigning the initial register block associated with the instruction includes: keeping the initial register block associated with the instruction according to a default table, and adjusting the initial register block associated with the instruction and assigning a different register block includes swapping the initial register block assigned to the instruction according to a swap table.

The programming product in one or more embodiments can include instructions that are embedded on and/or stored in a non-transitory computer readable medium that, when executed by at least one hardware processor, configure the at least one hardware processor to perform the operations specified above and discussed in this disclosure. The system according to an aspect can include a memory storage device storing program instructions; and a hardware processor couple to said memory storage device, the hardware processor, in response to executing said program instructions is configured to perform the operations specified above and discussed in this disclosure.

The foregoing and other objects, features, and advantages of the invention will be apparent from the following more particular descriptions of exemplary embodiments of the invention as illustrated in the accompanying drawings.

BRIEF DESCRIPTION OF THE DRAWINGS

The various aspects, features, and embodiments of a computer system, computer architectural structure, processor, processor architectural structure, processor pipelines, functional units, register files, and/or their method of operation, including the assigning of destination register entries (blocks) and/or routing of instructions in a processor pipeline, will be better understood when read in conjunction with the figures provided. Embodiments are provided in the figures for the purpose of illustrating aspects, features, and/or various embodiments of the computer system, computer architectural structure, processor, processor architectural structure, processor pipelines, functional units, register files, and their method of operation, including the assignment of destination register resources and/or routing of instructions in a processor pipeline, but the claims should not be limited to the precise system, embodiments, methods, processes and/or devices shown, and the features, and/or processes shown may be used singularly or in combination with other features, and/or processes. It may be noted that a numbered element is numbered according to the figure in which the element is introduced, is often, but not always, referred to by that number in succeeding figures, and like reference numbers in the figures often, but not always, represent like parts of the illustrative embodiments of the invention.

DETAILED DESCRIPTION

The following description is made for illustrating the general principles of the invention and is not meant to limit the inventive concepts claimed herein. In the following detailed description, numerous details are set forth in order to provide an understanding of the computer system, computer architectural structure, processor, processor architectural structure, processor execution pipelines, functional units, register files, and their method of operation, however, it will be understood by those skilled in the art that different and numerous embodiments of the computer system, computer architectural structure, processor, processor architectural structure, processor execution pipelines, functional units, and their method of operation may be practiced without those specific details, and the claims and invention should not be limited to the system, assemblies, subassemblies, architecture, embodiments, functional units, features, circuitry, processes, methods, aspects, and/or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising" specify the presence of stated features, integers, steps, operations, elements, and/or components, but do not preclude the presence or addition of one or more features, integers, steps, operations, elements, components, and/or groups thereof.

The following discussion omits or only briefly describes conventional features of information processing systems, including microprocessors, processors, processor architecture, processor execution pipelines, processor functional units, and register files which are apparent to those skilled in the art. It is assumed that those skilled in the art are familiar with the general architecture of processors, and, in particular, with processors having execution pipelines where each execution pipeline has one or more functional units including one or more execution units.

Figure 1:
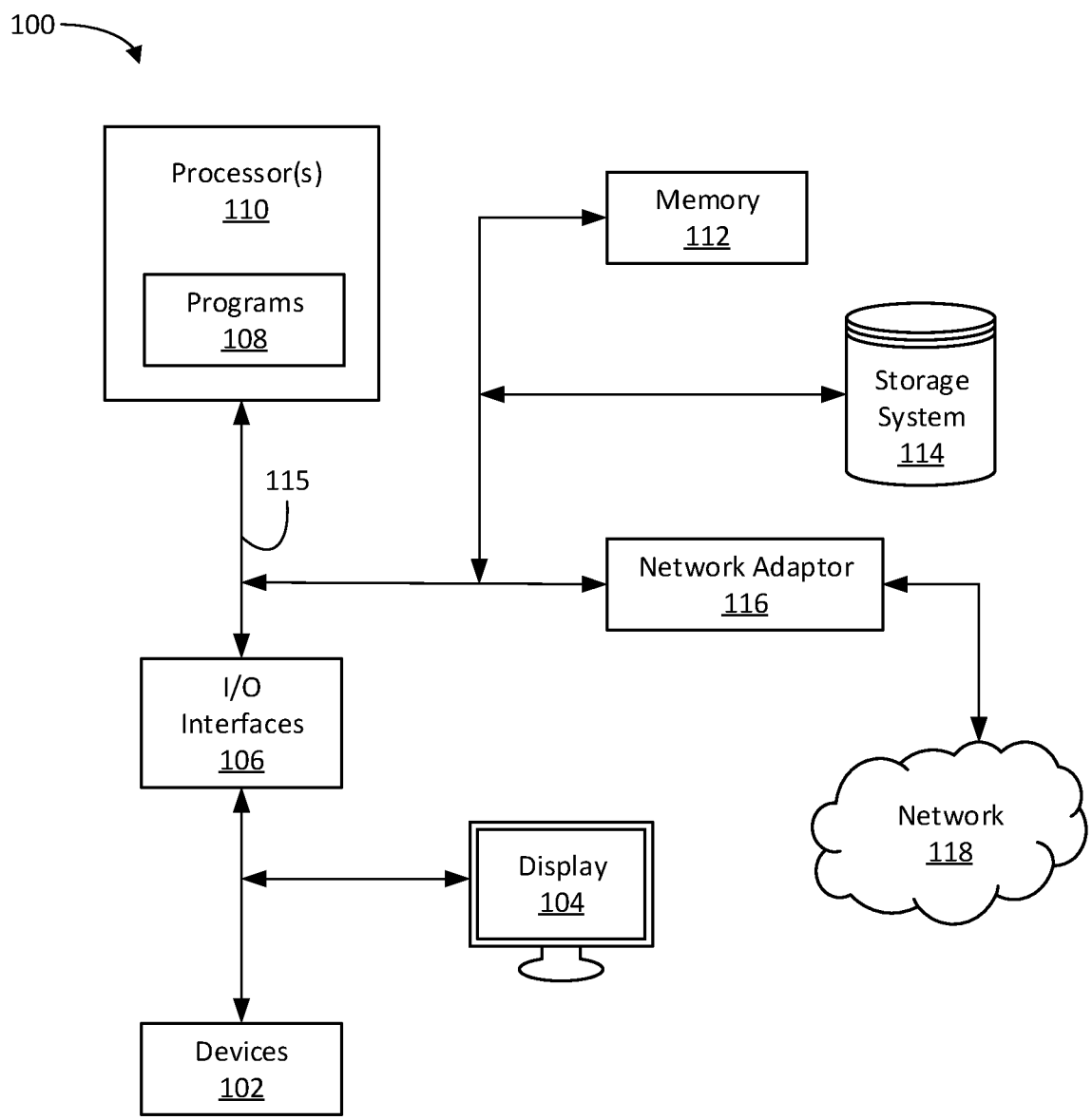
FIG. 1 illustrates an example of a data processing system in which aspects of the present disclosure may be practiced.

FIG. 1 illustrates an example computing and/or data processing system 100 in which aspects of the present disclosure may be practiced. It is to be understood that the computer and/or data processing system 100 depicted is only one example of a suitable processing system and is not intended to suggest any limitation as to the scope of use or functionality of embodiments of the present invention. For example, the system shown may be operational with numerous other special-purpose computing system environments or configurations. Examples of well-known computing systems, environments, and/or configurations that may be suitable for use with the system shown in FIG. 1 may include, but are not limited to, server computer systems, mainframe computers, distributed cloud computer systems, personal computer (PC) systems, PC networks, thin clients, thick clients, minicomputer systems, handheld or laptop devices, multiprocessor systems, microprocessor-based systems, smart phone, set top boxes, and programmable consumer electronics, that include any of the above systems or devices, and the like.

In some embodiments, the computer system 100 may be described in the general context of computer system executable instructions, embodied as program modules stored in memory 112, being executed by the computer system. Generally, program modules may include routines, programs, objects, components, logic, data structures, and so on that perform particular tasks and/or implement particular input data and/or data types in accordance with the present invention.

The components of the computer system 100 may include, but are not limited to, one or more processors or processing units 110, a memory 112, and a bus 115 that operably couples various system components, including memory 112 to processor 110. In some embodiments, the processor 110, which is also referred to as a central processing unit (CPU) or microprocessor, may execute one or more programs or modules 108 that are loaded from memory 112, where the program module(s) embody software (program instructions) that cause the processor to perform one or more operations. In some embodiments, module 108 may be programmed into the integrated circuits of the processor 110, loaded from memory 112, storage device 114, network 118 and/or combinations thereof.

The processor (or CPU) 110 can include various functional units, registers, buffers, execution units, caches, memories, and other units formed by integrated circuitry, and may operate according to reduced instruction set computing ("RISC") techniques. The processor 110 processes data according to processor cycles, synchronized, in some aspects, to an internal clock (not shown). Bus 115 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computer system may include a variety of computer system readable media, including non-transitory readable media. Such media may be any available media that is accessible by the computer system, and it may include both volatile and non-volatile media, removable and non-removable media.

Memory 112 (sometimes referred to as system memory) can include computer readable media in the form of volatile memory, such as random-access memory (RAM), cache memory and/or other forms. Computer system may further include other removable/non-removable, volatile/non-volatile computer system storage media. By way of example only, storage system 114 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 115 by one or more data media interfaces.

The computer system may also communicate with one or more external devices 102 such as a keyboard, track ball, mouse, microphone, speaker, a pointing device, a display 104, etc.; one or more devices that enable a user to interact with the computer system; and/or any devices (e.g., network card, modem, etc.) that enable the computer system to communicate with one or more other computing devices. Such communication can occur via Input/Output (I/O) interfaces 106. Communications adapter 116 interconnects bus 115 with an outside network 118 enabling the data processing system 100 to communicate with other such systems. Additionally, an operating system such as, for example, AIX ("AIX" is a trademark of the IBM Corporation) is used to coordinate the functions of the various components shown in FIG. 1.

The computer system 100 can communicate with one or more networks 118 such as a local area network (LAN), a general wide area network (WAN), and/or a public network (e.g., the Internet) via network adapter 116. As depicted, network adapter 118 communicates with the other components of computer system via bus 115. It should be understood that although not shown, other hardware and/or software components could be used in conjunction with the computer system. Examples include, but are not limited to: microcode, device drivers, redundant processing units, external disk-drive arrays, RAID systems, tape drives, and data archival storage systems, etc.

Figure 2:
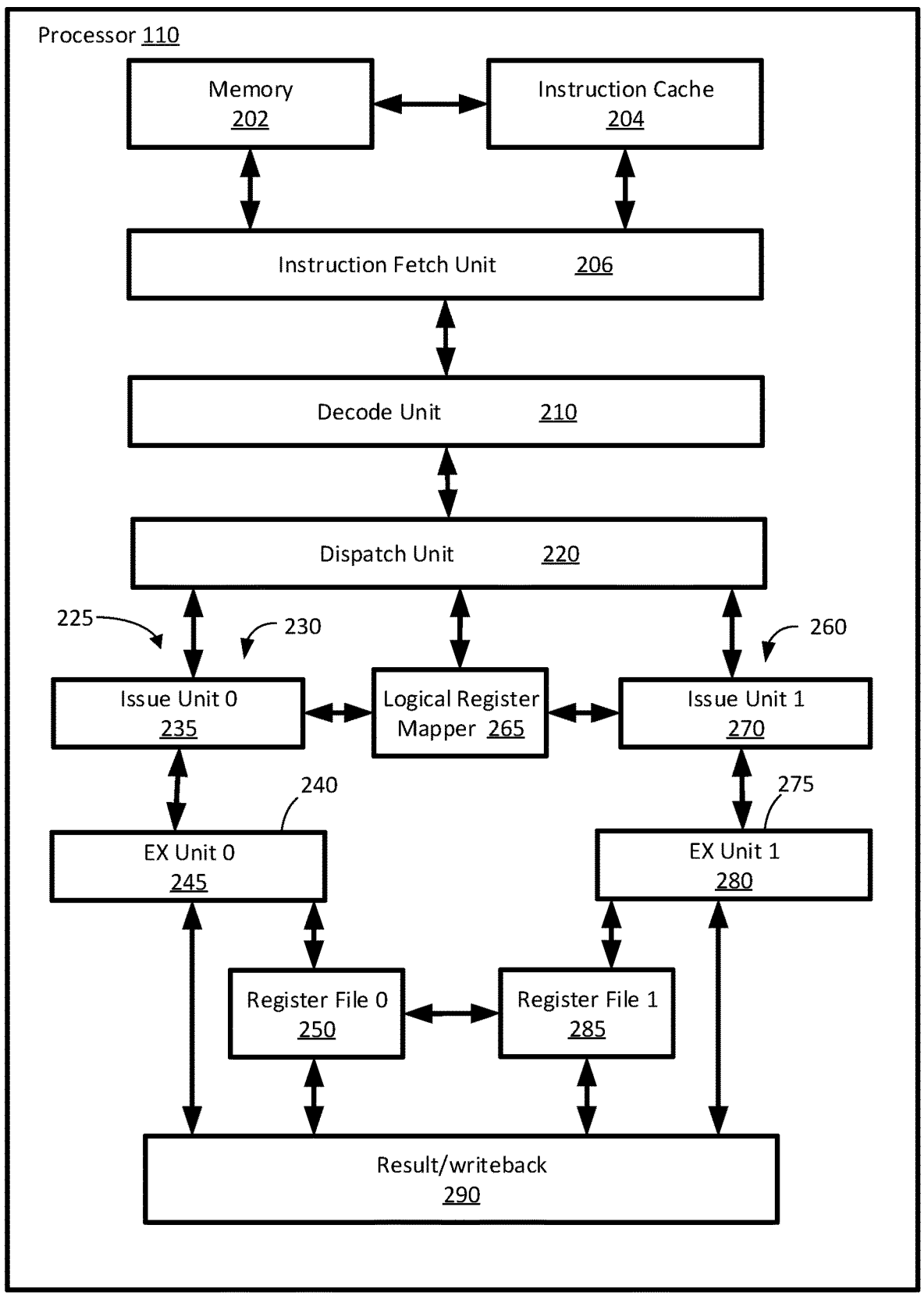
FIG. 2 illustrates a block diagram of a processor in which certain aspects of the present disclosure may be practiced.

FIG. 2 depicts a simplified block diagram of a processor 110 according to an embodiment. The processor 110 includes memory 202, instruction cache 204, instruction fetch unit 206, decode unit 210, dispatch unit 220, an execution slice 225 that includes LSU processing pipeline 230 and VSU processing pipeline 260, and destination resource 290. The processor 110 may be included within a computer system or otherwise distributed within a computer system, e.g., computer system 100. Instructions and data can be stored in memory 202, and the instruction cache 204 may access instructions in memory 202 and store the instructions to be fetched. The memory 202 may include any type of volatile or nonvolatile memory. The memory 202 and instruction cache 204 can include multiple cache levels.

In FIG. 2, a simplified example of instruction fetch unit 206, decode unit 210, dispatch unit 220, and execution slice 225 are depicted. In various embodiments, the processor 110 may include multiple processing execution slices 225, e.g., four execution slices 225. In an embodiment, each execution slice 225 includes processing pipeline 0 (230) and processing pipeline 1 (260). In an aspect, processing pipeline 0 (230) includes issue unit 0 (235), execution unit 0 (240), and physical register file 0 (250). Execution unit 240 in an embodiment includes one or more execution units 245, for example, a load-store unit, a vector-scalar unit, store/simple/branch (SX) unit, etc. Processing pipeline 0 (230) may also include other features, such as error checking and handling logic, one or more parallel paths through processing pipeline 0 (230), and other features now or hereafter known in the art. In an aspect, processing pipeline 1 (255) includes issue unit 1 (270), execution unit 1 (275), and physical register file 1 (285). Execution unit 275 in an embodiment includes one or more execution units 280, for example, a vector-scalar unit, a Fixed point (FX) unit, an Arithmetic Logic Unit (ALU), etc. Processing pipeline 1 260 may also include other features, such as error checking and handling logic, one or more parallel paths through processing pipeline 1 (260), and other features now or hereafter known in the art. Processor pipeline 225 also has a logical register mapper 255 which maps logical (architectural) register file entries to physical register file entries in register files 250, 285. That is, in the example embodiment of FIG. 2, processing pipeline 0 (230) and processing pipeline 1 (260) share logical register mapper 255. Not shown in FIG. 2 is a history buffer (HD), e.g., a save-restore buffer (SRB), to hold instructions and metadata on instructions evicted from the logical register mapper 255.

In the processor 110 of FIG. 2, the instruction fetch unit 206 fetches instructions from the instruction cache 204 according to an instruction address, for further processing by the decode unit 210. The decode unit 210 decodes instructions and passes the decoded instructions, portions of instructions, or other decoded data to the dispatch unit 220. The decode unit 210 may also detect branch instructions. More specifically as an overview, in the example of FIG. 2, the decode unit 210 will transmit the decoded instruction to the dispatch unit 220 which will dispatch the decoded instruction to either Issue Unit 0 (235) or Issue unit 1 (270). The respective issue units 235, 270 analyze the instructions or other data and transmits the decoded instructions, portions of instructions, or other data to execution units 240, 275 in the respective pipelines 230, 255 based on the analysis. The respective physical register file 250, 285 holds data for the respective execution units 240, 275. Physical register files 250, 285 can be separate register files where data in one register file can be used by either execution unit 240, 275, and in an embodiment register files 250, 285 can be a single register file. While a forward path through the processor 110 is depicted in FIG. 2, other feedback and signaling paths may be included between elements of the processor 110.

Processor 110 also includes result/write back logic 290 to write the results of executed instructions, e.g., results from processing pipeline 230 and processing pipeline 260, to a destination resource. The destination resource may be any type of resource, including registers, cache memory, other memory, I/O circuitry to communicate with other devices, other processing circuits, or any other type of destination for executed instructions or data. Register files 250, 285 have read ports for reading data residing in entries in the register files 250, 285, and write ports to write data to entries in the register files 250, 285. In an embodiment, the results are written back to certain blocks, e.g., STF blocks, of entries in the register files 250, 285. The processor 110 may include other circuits, functional units, and components.

Instructions may be processed in the processor 110 of FIG. 2 in a sequence of logical, pipelined stages. However, it should be understood that the functions of these stages and functional units may be merged together so that this particular division of stages should not be taken as a limitation, unless such a limitation is clearly indicated in the claims herein. Indeed, some of the stages or functional units are indicated as a single logic/functional unit in FIG. 2 for the sake of simplicity of understanding, and further detail as relevant will be provided below.

Figure 3:
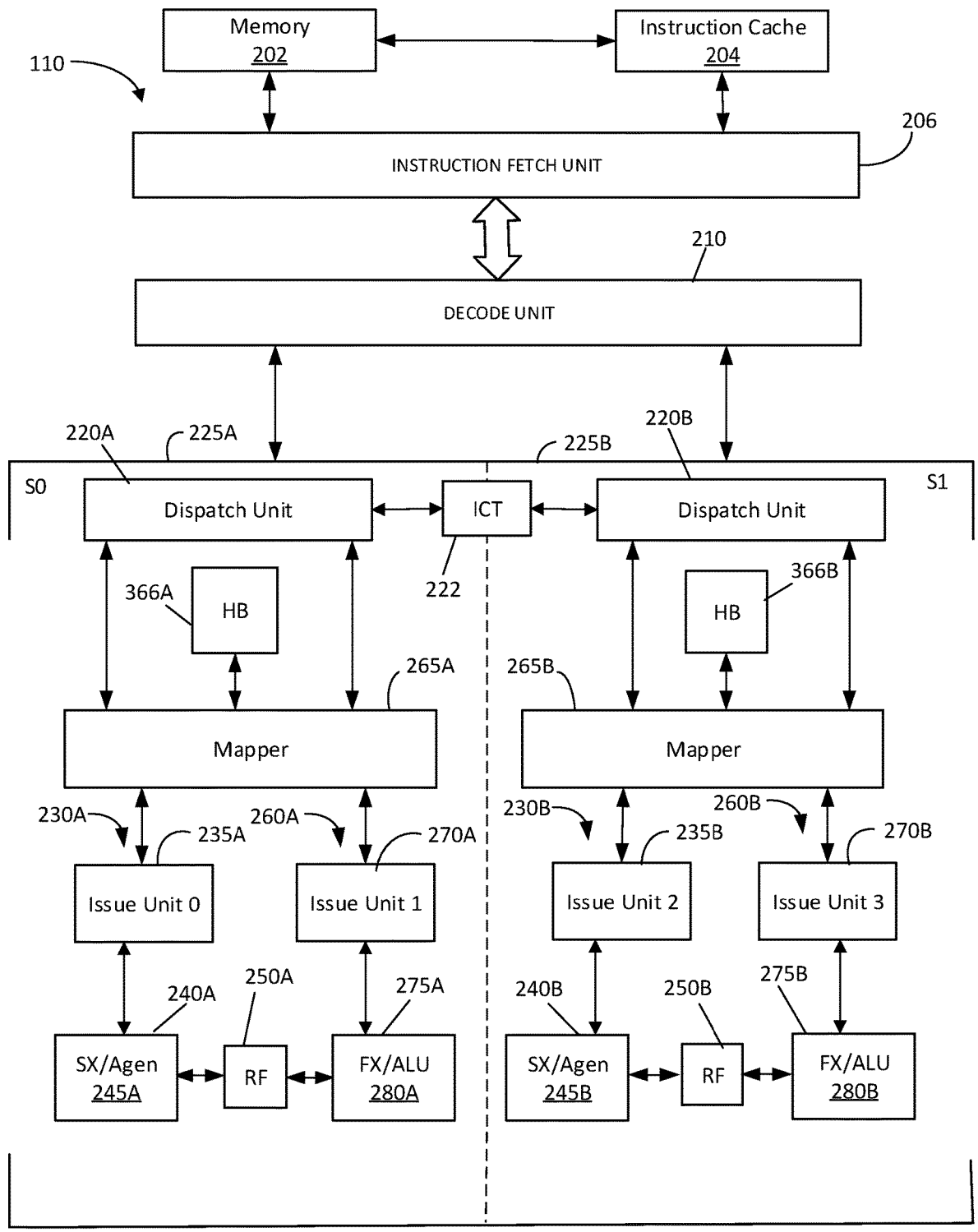
FIG. 3 illustrates a block diagram of a portion of a multi-slice processor having two execution slices (e.g., one SuperSlice) in accordance with certain aspects of the present disclosure.

FIG. 3 illustrates a block diagram of a portion of a processor 110, and in this example a multi-slice processor 110 in accordance with an embodiment of the disclosure. It may be noted that FIG. 3 only shows portions of the multi-slice processor 110 in diagrammatic fashion for purpose of discussion. It will be appreciated that the multi-slice processor may have other configurations. As shown in FIG. 3, the multi-slice processor 110 includes two processing slices-Slice 0 (slice S0 or 225A) and Slice 1 (slice S1 or 225B). The processor 110 also includes Memory 202, Instruction Cache 204, Instruction Fetch Unit 206, Decode Unit 210. Each of the slices S0 and S1 includes an Instruction Dispatch Unit (220A and 220B); a Logical Register Mapper (265A and 265B); a History Buffer (HB) (366A and 366B); a first processing pipeline (230A and 230B); and a second processing pipeline (260A and 260B). The two processing slices 225A and 225B share an Instruction Completion Table (ICT) (222).

Each first processing pipeline (230A and 230B) includes a first Issue Unit (ISQ) (235A and 235B), and first Execution Units (240A and 240B), where each execution unit 240A, 240B in the respective first processing pipeline 230A, 230B can include multiple execution units, including a SX/Agen execution unit (245A and 245B) as shown in the example of FIG. 3. First processing pipeline 230A, 230B can include other execution units, such as, for example, a load store unit (LSU), a floating-point execution unit (FPU), a fixed point execution unit (FXU), etc. Each second processing pipeline (260A and 260B) can include a second Issue Unit (ISQ) (270A and 270B) and Execution Units (275A and 275B), where each execution unit 275A, 275B in the respective second processing pipeline 260A, 260B can include multiple execution units, including a FX/ALU execution unit (280A and 280B) as shown in the example of FIG. 3. Second processing pipeline 260A, 260B) can include other execution units, such as, for example, vector scalar units (VSUs), floating point execution units (FPU), etc.

A physical Register File (RF) 250A can be used by both first processing pipeline 230A and second processing pipeline 260A in SuperSlice 225A, while a physical Register File 250B can be used by both first processing pipeline 230B and second processing pipeline 260B in SuperSlice 225B. While processor 110 in FIG. 3 shows a single register file 250A, 250B shared between the first and second processing pipelines 230, 260, it can be appreciated that one or more register files 250 can be used in the first and second processing pipelines and across execution slices 225A and 225B. The Execution Units 240A, 240B, 275A, 275B can include one or more queues to hold instructions for execution by the Execution Units. It can be appreciated that the physical register files 250A, 250B contain a plurality of entries, and the physical register files 250A, 250B can be subdivided into blocks of entries, where in an aspect each block of entries receives (contains one or more write ports to receive) data from a specific execution unit, more specifically a specific execution unit such as for example SX/AGen 245, FX/ALU 280.

The Instruction Fetch Unit 206 fetches instructions to be executed by the processor 110. Instructions that are fetched by the Instruction Fetch Unit 206 are sent to the Decode Unit 210 where the instructions are decoded by instruction type. The Decode Unit 210 transmits the decoded instructions to respective Instruction Dispatch Unit 220A, 220B. The Instruction Dispatch Units 220A, 220B dispatch instructions to first respective Issue Unit 235 or second respective Issue Unit 270 depending upon the type of instruction and which execution units 240 or 275 should process that particular instruction. The Instruction Dispatch Units 220A, 220B dispatch the instructions to the respective first Issue Unit 235 or second Issue Unit 270 typically in program order. In one or more embodiments, each instruction dispatched to the first Issue Unit 235 or second Issue Unit 270 is stamped with an identifier, e.g., identification tag (iTag), to identify the instruction. The instructions can be stamped with other information and metadata. The instructions (iTags) typically are allocated (assigned) and stamped in ascending program order on a per thread basis.

The respective first Issue Unit 235 or second Issue Unit 270 will issue instructions to the respective execution units 240 or execution units 275 based upon the instruction type. For example, multi-cycle arithmetic instructions, matrix-multiply accumulator (MMA) instructions are typically handled by the second processing pipeline 260 (for example by FX/ALU execution unit 285), while store instructions, load instructions, branch and store instructions are typically handled in the first processing pipeline 230 (for example in the SX/Agen unit 245). The first and second Issue Units 235, 270 typically hold an instruction until data associated with the instruction has been retrieved and ready for use. In certain aspects, the respective first Issue unit 235 and second Issue Unit 270 holds a set of instructions while the physical register file 250 accumulates data for the instruction inputs. A register file may be used for staging data between memory and other functional (execution) units in the processor. There may be numerous register files and types. When all source data accumulates for the instruction, the data in one or more embodiments is passed on to one or more execution units 240, 275 designated for execution of the instruction. A physical register (or main register) file 250 may serve to store data to be used in an operation specified in an instruction dispatched to Execution Units 240, 275, and the result of the operation performed by the Execution Units 240, 275 (e.g., SX/Agens 245 and FX/ALUs 280) may be written to the designated target register entry in the physical register file 250. Each of the execution units, can make result data available on the write back buses for writing to a register file (STF) entry.

Logical register mapper 265 contains metadata (e.g., iTag, STFtag, etc.) which provides a mapping between entries in the logical register (e.g., GPR1) and entries in physical (main) register file 250 (e.g., physical register array entry). The STFtag is the pointer that correlates a logical register entry (LREG) to an entry in the physical register file 250. For example, when an instruction wants to read a logical register, e.g., GPR1, the logical register mapper 265 tells respective issue unit 235, 270, which tells respective execution unit 240, 275, e.g., SX/Agen 245 and FX/ALU 280 where in the physical register file 250 it can find the data, e.g., the physical register array entry. The respective Execution Unit 240, 275, e.g., SX/Agen 245 or FX/ALU 280, executes instructions out-of-order and when the respective Execution Unit 240, 275 finishes an instruction, the respective Execution Unit 240, 275 will send the finished instruction, e.g., iTag, to the ICT 222. The ICT 222 contains a queue of the instructions dispatched by the Dispatch Unit 220 and tracks the progress of the instructions as they are processed.

When a mispredicted branch instruction or other exception is detected, instructions and data subsequent to the mispredicted branch or exception are discarded, e.g., flushed from the various units of processor 110. A history buffer (HB) 366, e.g., Save & Restore Buffer (SRB) 366, contains both speculative and architected register states and backs up the logical register mapper 255 when a new instruction is dispatched. In this regard, the history buffer (HB) 366 stores information from the logical register mapper 265 when a new instruction evicts data from the logical register mapper 265 in case the new instruction is flushed and the old data needs to be recovered. The history buffer (HB) 366 keeps the stored information until the new instruction completes. History buffer (HB) 266 interfaces with the logical register mapper 265 in order to restore the contents of logical register mapper 265 from the history buffer (HB) 266 back to the logical register mapper 265, updating the pointers in the logical register mapper 265 so instructions know where to obtain the correct data, e.g., the processor is returned to the state that existed before the interruptible instruction, e.g., the before branch instruction was mispredicted.

CPU 110 having multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. Simultaneous processing in multiple execution slices may considerably increase processing speed of the multi-slice processor. In single-thread (ST) mode a single thread is processed, and in SMT mode, two threads (SMT2) or four threads (SMT4) are simultaneously processed.

Figure 4:
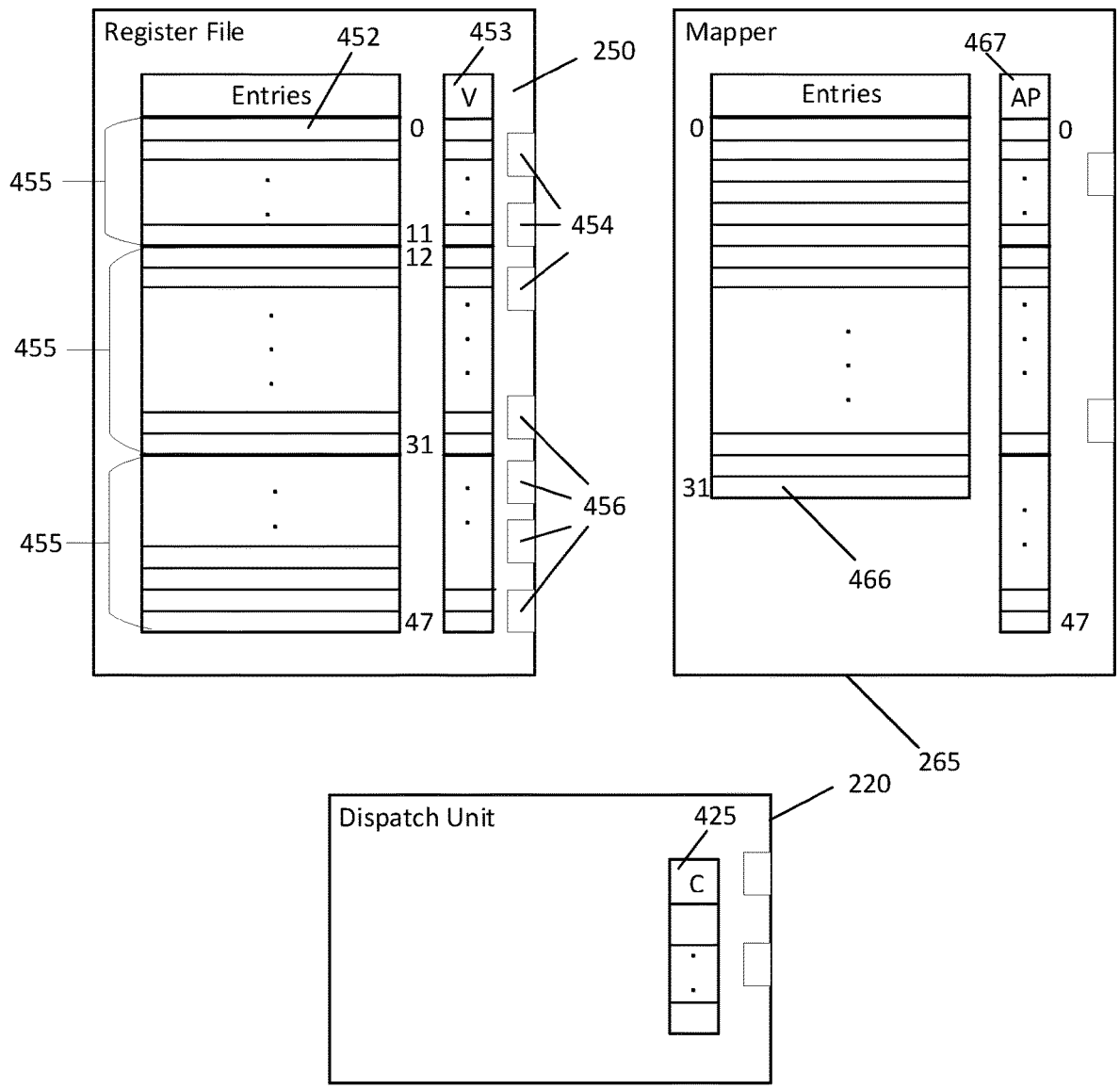
FIG. 4 illustrates a block diagram of a more detailed view of a Dispatch Unit, a Register file subdivided into a plurality of blocks or banks, and a Mapper according to an embodiment of the disclosure.

FIG. 4 illustrates a more detailed view of Dispatch Unit 220, register (rename) file 250 and Mapper 265 according to one or more embodiments of the disclosure. In one or more embodiments of the processor 110, the register file 250 as illustrated in FIG. 4 contains a plurality of entries 452, and the register file 250 is sub-divided into two or more blocks 455 or banks 455, each block/bank 455 containing a plurality of the register file entries 452. Physical (rename) register file 250 also contains a plurality of write ports 454 and a plurality of read ports 456. Register file 250 further includes a valid (V) register bit field 453 that is used to indicate whether a register file entry 454 is available for use. The register file 250 provides information to Mapper 265 identifying the register file entries 452 that are available to receive data (e.g., ready to be used). Mapper 265 in the example of FIG. 4 includes a plurality of mapper entries 466 and maintains, for each register block 455, an available pool (AP) 467 of rename register entries 452 that are ready (available) to be allocated. The Mapper 265 in an embodiment sends to the Dispatch Unit 220 information indicating each register block 465 that has register entries 452 that can be allocated (e.g., are ready for use). The Dispatch Unit 220 maintains a counter (C) 425 for each register block 455 that tracks the number of register file entries 452 that are available to be allocated. When the Dispatch Unit 220 sends an instruction to the Mapper 265 (and Issue Unit 235) that uses a register block 455, the Dispatch Unit 220 decrements the counter (C) 425 for that respective register block 455, and when a register entry 452 is retired by the Mapper 265 (e.g., after a completion or flush), the Mapper 265 increments the counter (C) 425 of that respective register block 455.

Each execution unit 245, 280 in one or more embodiments are assigned a block 455 of register file entries 452 to which the respective execution unit 245, 280 can write data. Additionally, or alternatively, certain instructions can only be processed in certain execution units in either first processing slice 230 or second processing slice 260. In one or more embodiments, the architectural registers (the logical registers (LREGs)) can in circumstances be assigned so results are written back to the physical (rename) register file entries 452 in an uneven manner such that some blocks 455 in register file 250 become full or nearly full, while other blocks 455 are underutilized. In circumstances where blocks 455 of register file entries 452 are full or nearly full, the processor can stall dispatching instructions to the processing pipelines. To alleviate this potential bottleneck where one or more blocks 455 of register file entries 452 are nearly full, while one or more other blocks 455 of register file entries 452 are underutilized, a mechanism is provided to dynamically steer results of instructions (e.g., the write of execution unit results) to less full register blocks 455 to reduce the imbalance of register file entries 452 in various blocks 455 of the register file 250.

In an embodiment a mechanism is used to detect that an imbalance in register block 455 usage is occurring based upon the number of entries 452 available within a particular register block 455 dropping below a threshold level, and then attempts to rectify the imbalance by steering more of the unrestricted operations to the blocks 455 that have more available entries 452. In an approach, the instructions that can be executed by one or more processing pipelines and/or in one or more execution units can be steered (e.g., assigned and routed) to the processing pipeline and/or execution units that write results to the block 455 of the register file 250 that has greater availability of register entries 452. In an aspect, Mapper 265 can send register block utilization rates to Dispatch Unit 220. Logic in Dispatch Unit 220 can review/examine the fullness or utilization status of each register file block 455 and then steer (e.g., assign and/or route) more instructions to register blocks 455 that have more unused (empty) entries 452.

In another embodiment, routing logic in Dispatch Unit 220 checks only that there are at least some entries (STF tags) 452 available in at least some of the blocks 455 in the register file 250, and checks that other resource requirements are met, and makes the initial assignment decision without regard to balancing the register blocks 455. After the assignment decision has been made, the specific register entry 452 assignment is adjusted to not overrun register blocks 455 that are already full. That is, while register block 455 assignments in the register file 250 are usually made in parallel with the routing decision, in an embodiment, a fast adjustment is made one or more cycles after the initial assignment and/or routing decision to minimize unnecessary stalling due to the initial chosen register blocks 455 being nearly full. This mechanism of making an adjustment later can be beneficial in a highly pipelined processor where usage cannot be communicated immediately everywhere. By making adjustments later in the processing pipeline after the initial assignment decision in the Dispatch Unit, register entries 452 that were used when making an assignment and/or routing decision can be released (no longer used) by the adjustment stage, and instructions then can be reassigned and routed to register entries 452 in register blocks 455 that were recently released.

Figure 5:
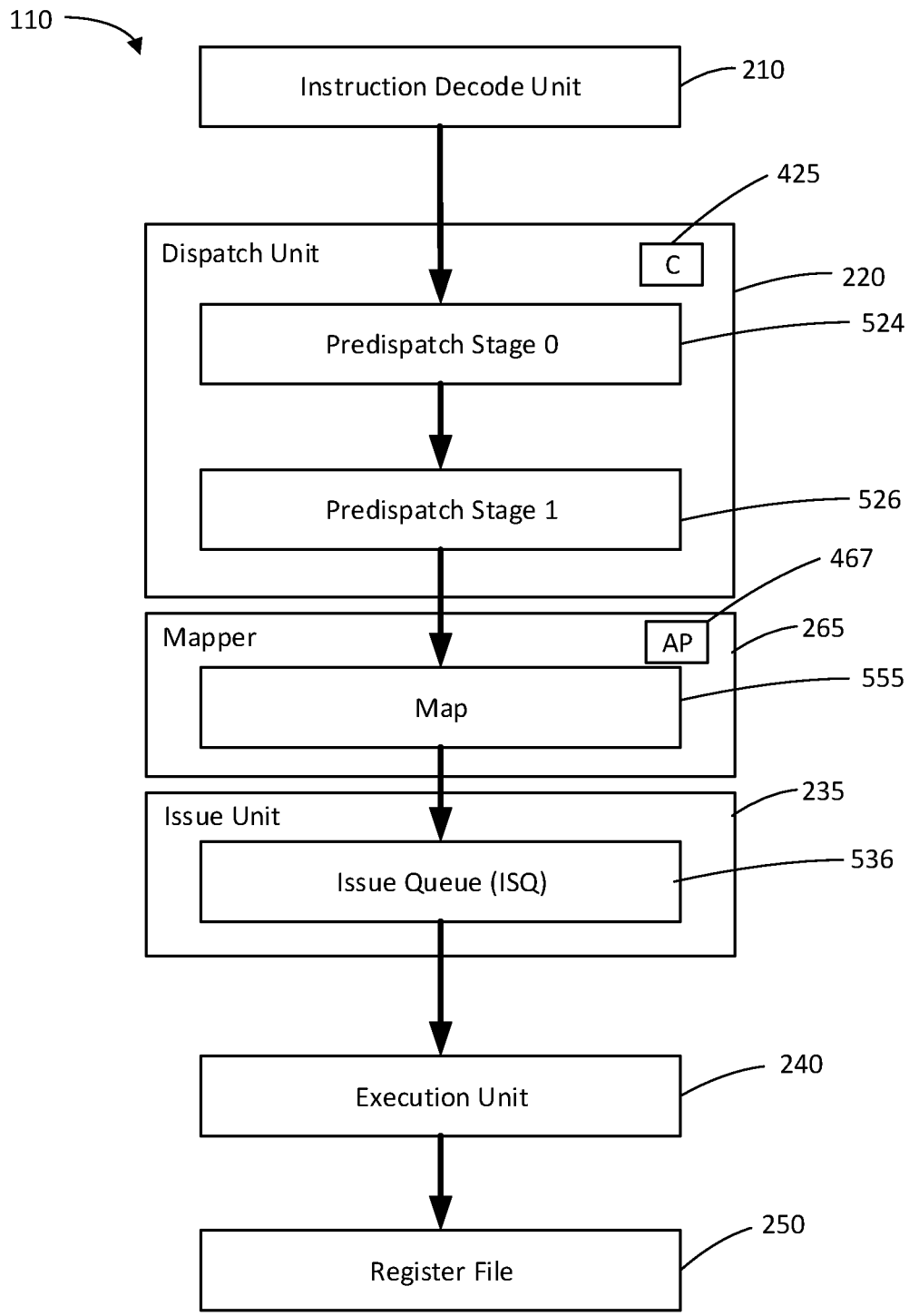
FIG. 5 illustrates a block diagram of a simplified overview of the functional units showing a portion of the processing stages in a processor in accordance with an embodiment of the disclosure.

FIG. 5 illustrates an example processing of instructions in cycles in a pipeline (e.g., pipeline 225A) in processor 110 according to one or more embodiments of the disclosure. Instructions are decoded in decode unit 210 and are directed to one of multiple processing pipelines and to one of the execution units in the processing pipeline for execution in the processor. In many processors, a number of instructions can be executed by one or more execution units. For example, simple arithmetic operations, or other trivial instructions can be executed by more than one execution unit. To reduce latency, in situations where register blocks 455 to which instruction results are to be written are full or nearly full, a processor can direct instructions to one of the one or more pipelines, and to one of the one or more execution units in the processor pipeline that write back the results to a register block 455 of the register file that has greater capacity than other register blocks 455, and/or to avoid a register block 455 that is full or nearly full, in order to avoid and/or prevent the processor from stalling, and accordingly to improve processor latency.

In one or more embodiments, as shown in FIG. 5, the Instruction Dispatch Unit (IDU) 220 receives decoded instructions from the Instruction Decode Unit 210. At pre-dispatch stage 0 (524) the decision where to assign and/or route instructions is made. That is, the decision is made at per-dispatch 0 (524) as to which processing pipe and/or Issue Unit 235 (e.g., Issue Queue (ISQ) 536) should receive the instruction for processing. The decision as to which processing pipe and/or Issue Unit 235 (e.g., Issue Queue (ISQ 536) to issue the instructions can be based upon many factors, including the type of instruction, the execution units in various pipelines, and which queues, which register banks or blocks 455 of the register file 250, and other resources, have available space. Next, at pre-dispatch stage 1 (526) the decision is made as to which register bank or block 455 of the register file 250 will receive the results after the instruction is executed in an execution unit 240. That is, at the pre-dispatch stage 1 (526) the decision is made as to which register bank or block 455 to write the result of the executed instruction. The destination register bank or block 455 to write the result will be communicated to the Issue Queue 236 and Mapper 265. In an embodiment, the Pre-Dispatch 0 (524) and Pre-Dispatch 1 (526) stages occur in the Instruction Dispatch Unit 220. Most dispatch decisions typically are made in Pre-Dispatch 0 (524) and pre-Dispatch 1 (526) stages.

Next during the Map stage 555, the specific register entry 452 in the register block 455 to receive the result of the instruction is allocated (e.g., selected) by the Mapper 265. That is, the instruction's destination register entry 452 (the address of the rename register) is allocated by the Mapper 265 at Map stage 555. The address is allocated at Map stage 555 as the address of the selected register entry 452 is written into the issue queue as the instruction's result destination in the next stage. It is noted that any following instructions that source that destination register entry 452 will also receive that address from the Mapper 265. The instruction is dispatched to the Issue Unit 235 and during the next stage (referred to as the ISR stage) written into the Issue Queue (ISQ) 536 in the Issue Unit 235. The instruction might reside in the Issue Queue 536 for a while. When data and resources (e.g., register file resources) are available (which can take more than one cycle), then the instruction is issued to the Execution Unit 240. The instruction can issue from the Issue Queue 536 to the Execution Unit 240 out of order with respect to the program.

The instruction is issued from the Issue Queue 536 to the Execution Unit 240 when the source registers are available (the source register entry 452 contains the required data), and the Execution Unit 240 is available, among other considerations. The Execution Unit 240 executes the instruction and returns (e.g., writes) the result to the identified destination (rename) register entry 452. Since in embodiments, a certain bank 455 of the register file 250 can be written to only by a particular execution unit (e.g., not all execution units can write to all banks 455 of the register file 250), if the register file entry 452 identified in the certain block 455 of register file 250 as the destination for the result of the execution unit is unavailable, the processor might stall as it waits for that entry 452 in the register block 455 to become available. Disclosed are embodiments to detect that an imbalance in register file block usage is occurring and steering (e.g., assigning and/or routing) one or more operations, e.g., unrestricted operations, to register file blocks 455 that have available register entries 452, to avoid the processor from stalling because of unavailable destination resources (e.g., an unavailable register file entry 452).

Figure 6:
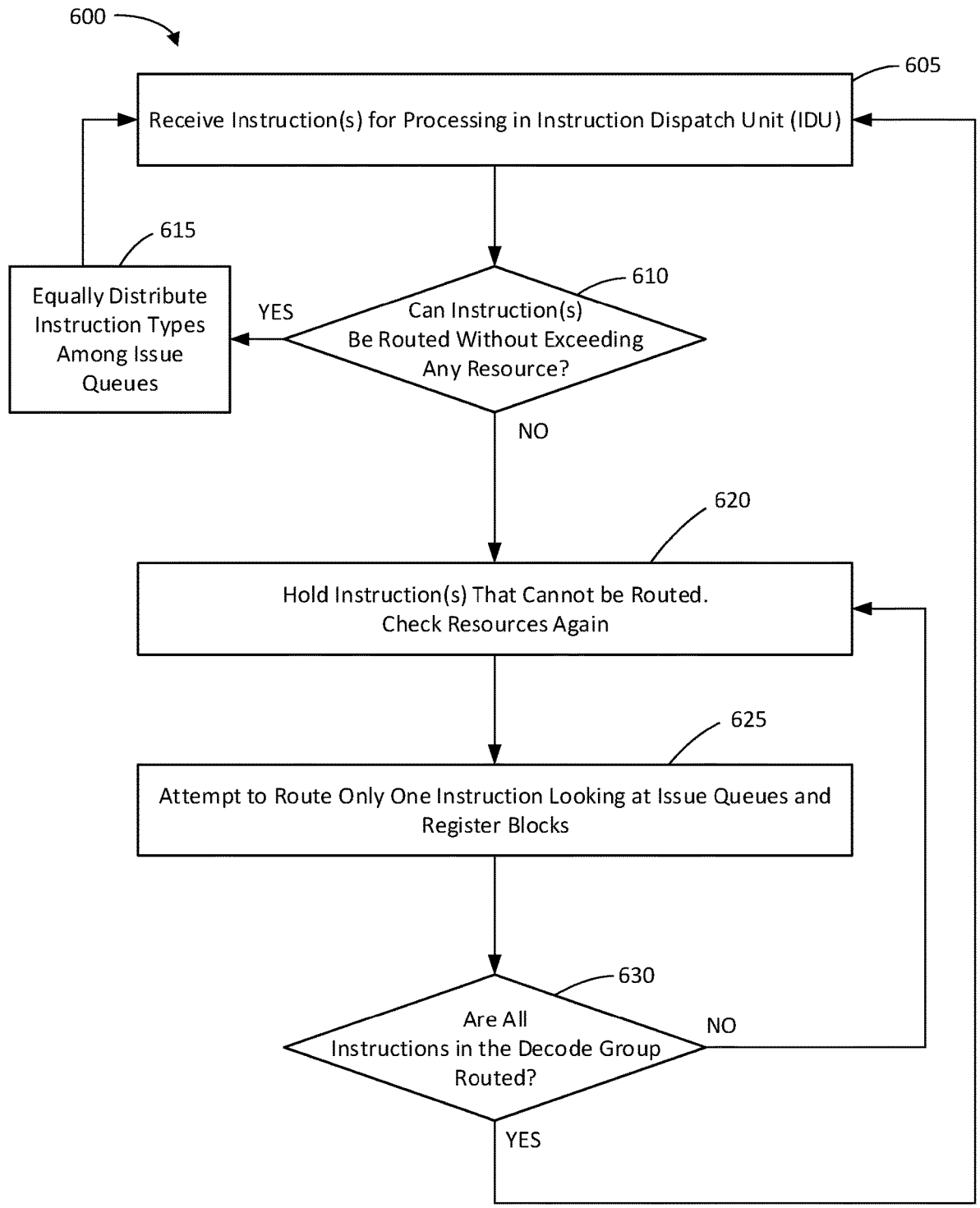
FIG. 6 illustrates flow chart of a method of processing instructions in accordance with an embodiment of the disclosure.

FIG. 6 is an exemplary overview flowchart in accordance with an embodiment illustrating and describing a method 600 of routing instructions in a processor. While the method 600 is described for the sake of convenience and not with an intent of limiting the disclosure as comprising a series and/or a number of steps, it is to be understood that the process 600 does not need to be performed as a series of steps and/or the steps do not need to be performed in the order shown and described with respect to FIG. 6, but the process 600 may be integrated and/or one or more steps may be performed together, simultaneously, or the steps may be performed in the order disclosed or in an alternate order.

The method 600 in FIG. 6 relates to routing instructions in a processor preferably with multiple execution pipelines and/or execution units. At 605, one or more instructions are received by the instruction dispatch unit for processing. It can be appreciated that the instructions can be received as a group of instructions or as one instruction at a time, but in an example embodiment up to eight instructions are received at a time as a group by the instruction dispatch unit 220. The one or more instructions received by the dispatch unit is referred to as the first decode group of instruction. At 610 it is determined whether the one or more instructions can be routed without exceeding any resource. For example, issue queues and register banks can be checked to determine whether any resource will be exceeded. If at 610 processor pipeline resources will not be exceeded (610: Yes), then at 615 the instruction types are equally distributed among the issue units (e.g., Issue Queues 536).

For example, at 615 when the instructions can be routed without exceeding resources the routing logic can attempt to balance different instruction classes among the issue queues so that the issue queues remain approximately equally utilized. Some instruction types have longer latency than others, for example floating point instructions have a relatively long latency, so in an embodiment routing logic attempts to spread floating point instructions equally among the one or more issue queues. Similarly loads and stores are ideally equally spread among the one or more issue queues. At 615 dispatch routing logic assigns the one or more instructions, in the example embodiment the eight instructions, from the decode unit 210 to the issue queues (e.g., Issue Queues 536). In an embodiment, the dispatch decision as to what issue queue to assign and route the instruction is made at the pre-dispatch stage 0 (524). According to an approach, the routing decision does not take into account rebalancing the (rename) register banks, and only checks that a (rename) register bank will be available (e.g., register bank will not be overrun). That is, in an approach, at this stage of processing the instruction(s) (e.g., at pre-dispatch 0 (524) stage), routing logic in the dispatch unit at pre-dispatch stage 0 (524) makes its decision as to the issue queue (ISQ) to assign the instruction without regard to balancing the rename register banks. In an embodiment, the decision and/or selection of the rename block 455 is made at pre-dispatch 1 (526) stage, and the actual register (rename) address (e.g., register entry 452) in the register (rename) block 455 is assigned/selected during the Map cycle 555 (by Mapper 265).

If at 610 it is determined that the instructions cannot be routed without exceeding the resources (610: No), then the process 600 continues to 620 where in an embodiment the one or more instruction(s) are held, and in an approach, the resources are checked again. The process 600 after 620 continues to 625 where an attempt is made to route one instruction looking at the resources at for example the issue queues (e.g., Issue Queues 536) and destination register blocks 455. If the instruction can be processed, e.g., there are available resources, the instruction is processed and routed. Process 600 continues after 625 to 630 where it is determined whether all the one or more instructions, e.g., all eight of the instructions, in the first decode group of instruction are routed. If at 630 it is determined that all the one or more instructions, e.g., all eight of the instructions, in the decode group have not been routed (630: No) then process 600 goes back to 620 where the resources are checked again, and to 625 where an attempt is made to route one of the one or more instructions remaining in the first decode group by looking at the resources of the processor including the issues queues and destination register blocks, e.g., the availability of an issue queue and a destination register block for processing the instruction. If resources are available to process another instruction in the first decode group, that instruction is processed, and this process of going back to 620 and 625 to process the one or more instructions from the first decode group is continued until at 630 it is determined that all the instructions in the first decode group have been routed (630: Yes), and then the process 600 goes back to 605 where one or more instructions (e.g., a second decode group of instructions) are received by the dispatch unit 220 from the decode unit 210 and the routing process 600 starts again at 610.

Figure 7:
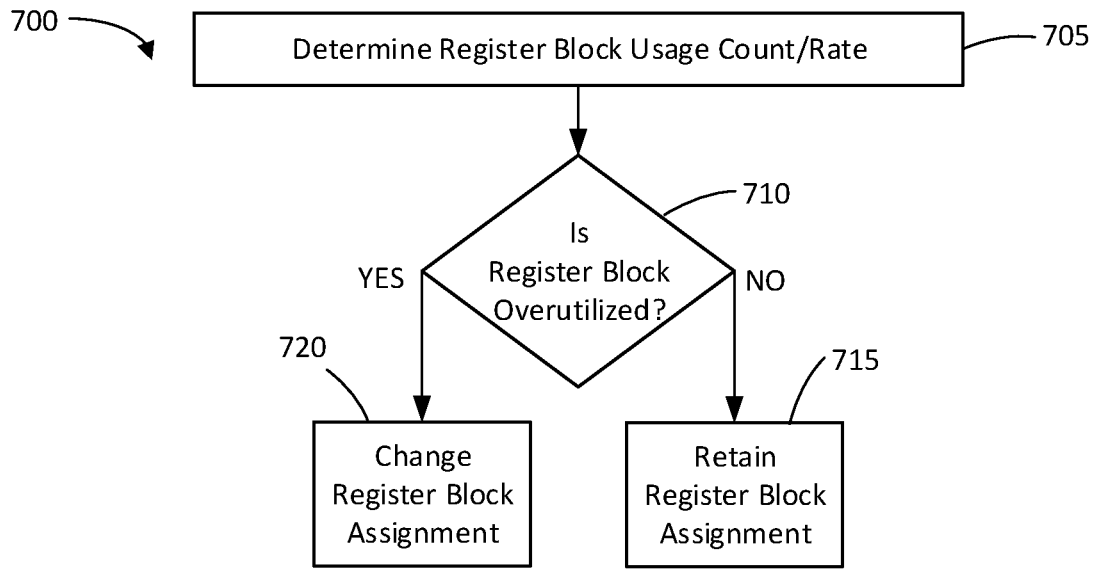
FIG. 7 illustrates a flow chart of a method according to an embodiment for assigning destination register blocks in a processor.

FIG. 7 is an exemplary overview flowchart in accordance with an embodiment illustrating and describing a method 700 of assigning and/or routing instructions to various functional units and/or destination register file blocks in a processor, and, in an embodiment, re-assigning instructions to be processed in a manner where the results are written to a different destination (rename) register block to potentially improve processor latency. While the method 700 is described for the sake of convenience and not with an intent of limiting the disclosure as comprising a series and/or a number of steps, it is to be understood that the process 700 does not need to be performed as a series of steps and/or the steps do not need to be performed in the order shown and described with respect to FIG. 7, but the process 700 may be integrated and/or one or more steps may be performed together, simultaneously, or the steps may be performed in the order disclosed or in an alternate order.

In process 700, during processing of an instruction, for example at the dispatch unit, a register block usage count and/or rate is determined at 705 for one or more register blocks, and in an approach for each of the register blocks. For example, in an embodiment the register block usage count and/or rate is determined for one or more (e.g., selected) register blocks 455 (e.g., for a register block 455 associated with and/or assigned to an instruction) and/or each register block 455 in the register file 250. That is, in 705 the number of entries in a particular register bank, and in an embodiment the number of entries in each register bank, that are available for use or that are being used is determined and/or calculated.

The register block usage count and/or rate can be determined in one or more manners. In an approach the number of register entries 452 in each register block 455 in the register file 250 that are valid and being used are counted from for example, the valid field 453 in the register file 250, and that information (number of register files 452 per register block 455 being used) can be used to calculate a usage count and/or rate for a particular register block and/or for each register block in the register file. In an approach, that information (e.g., the number of register entries in a register block and/or the register entry count in each register bank) is sent to the dispatch unit 220, directly or indirectly, and stored in counter 425 in the Dispatch Unit 220. In one or more approaches, the Mapper 265 can maintain for each register block 455 an available pool (AP) 467 of register entries 452 that are ready to allocate and the number or count of register entries 452 (and in an aspect the identity of the register entries 452) available for allocation by the Mapper 265 (or vice versa the number of register files 425 per register block 455 being used) per register block 455 is sent to the Dispatch Unit 220, and the number of register entries 452 in each register bank 455 that can be allocated (or vice versa the number of entries 452 in each register block 455 that are being used) can be stored in the counter 425 in the Dispatch Unit 220. The Mapper 265 can receive information from the register file 250 on the register file entries 452 that are in usage (or vice versa the register file entries 452 that are not in use and can be allocated) from the register file 250. In other approaches, the Dispatch Unit 220 can have one or more bank counters 425 that maintains a running count of the number of register file entries 452 in each register block 455 that are available for use by decrementing the count in respective counter 425 when Dispatch Unit 220 sends an instruction associated with and/or assigned to a register block 455 to the Mapper 265 and/or the Issue Queue 536, and increment the count in the respective counter 425 when the Mapper 265 retires an instruction. Other means of determining the register block usage count/rate (or available count/rate) are contemplated.

At 710 it is determined whether a specific (e.g., assigned) register block, or one or more register blocks, including for example each register bank, is being overutilized. In one or more embodiments, the register block usage count and/or rate is used to determine whether a particular register bank is being overutilized. In an embodiment, it is determined at 710 whether a register block associated with an instruction is overutilized. In an aspect, at 710 the utilization rate or an availability rate of a register block is determined, where a utilization rate in an aspect provides information on how many register entries in a register block are being used and an availability rate is related to utilization or usage rate as it provides information on how many register files in a register block are available for use (e.g., not being used). The usage rate and availability rate measure how full a register bank is and can be used to determine whether a register bank is being overutilized. In a further embodiment, at 710 the utilization or availability rate is determined for each of the register blocks 455 in a register file 250. In an embodiment, at 710 it is determined whether the register block 455 to be assigned to, or that was initially assigned to, an instruction is overutilized.

Determining whether a register block 455 is overutilized at 710 can be accomplished in a number of manners or ways. In an approach, the register block usage (utilization) count/rate can be compared to a threshold. In an alternative approach the register block availability rate, which is also a measure of the register block usage rate, can be compared to a threshold. In one or more embodiments, determining whether a register block is overutilized includes comparing the count of used (or available) register entries in a register block (the usage rate of the register blocks) in the register file to the threshold. The threshold can be fixed, predetermined, predefined, preset, adjustable, and/or programmable and will depend upon the design characteristics desired of the processor. For example, in a scenario where the usage rate of a register block 455 is 80% indicating that 80% (eight out of ten) of the register entries 452 in a register bank 455 are being used, and the threshold for determining overutilization of the destination register bank 455 is set at 75%, the register bank associated with the instruction is overutilized as its utilization rate is over the threshold. It can be appreciated by a person of skill in the art that availability counts/rates could be used instead of usage (utilization) counts/rates, as well as determining underutilization of register blocks instead of overutilization of register blocks, and that different threshold values would be selected depending upon the criteria and parameters used to determine register bank usage/availability. Accordingly, in the example above, the availability rate of the register block 455 is 20% as 2 out of ten register file entries in the register block are available for use, and the threshold for determining underutilization is 25%, and since the availability of 20% is less than 25% and not greater than 25%, the register block is not underutilized.

If at 710 a register block is not being overutilized, e.g., is being underutilized (710: No), then the process 700 continues to 715 where the register block associated with (e.g., initially assigned) the instruction is retained. For example, if the register block has been assigned to an instruction, and that register block is being underutilized or at least not over utilized (710: No), then the process continues to 715 where those assignments and/or routing decisions are not disturbed and the process retains the register bank assignment for that instruction. In another example, where an instruction through routing logic, in for example the dispatch unit, desires to select and/or assign a particular destination register block for the result of the instruction to be written, for example because the processor desires to use a preferred execution unit to process the instruction which writes its result to a particular register block, and the processor determines that the particular register block to be associated with and assigned to that instruction is underutilized, or at least not overutilized (710: No), then the preferred assignment of a destination register block for that instruction can be retained.

If the register block associated with an instruction is overutilized (710: Yes), then the process 700 continues to 720 where the register bank assignment logic reassigns the destination assignment to a register block that is not overutilized and/or at least less utilized than the register block associated with the instruction. That is, in an embodiment at 710 where an instruction is initially associated with and/or assigned to a destination register block that is overutilized (710: Yes), then the processor, Dispatch Unit, and/or system at 720 attempts to reassign the register bank of the instruction destination so that it writes its result to a different destination register block, for example a register block that is underutilized and/or at least less utilized than the associated register block. For example, if an instruction associated with a register block has a register block usage rate more than the threshold indicating overutilization of the register block (710: Yes), than at 720 the assignment and routing of the instruction can be changed so the result is written to a different destination register block. In other words, the register block assignment for that instruction is changed. It can be appreciated that the register block assignment in one or more embodiments will be unable to be changed for example in those situations where the instruction is restricted to writing to a particular register block, for example, where the instruction is restricted to a specific execution unit that only writes to a specific register block.

Figure 8:
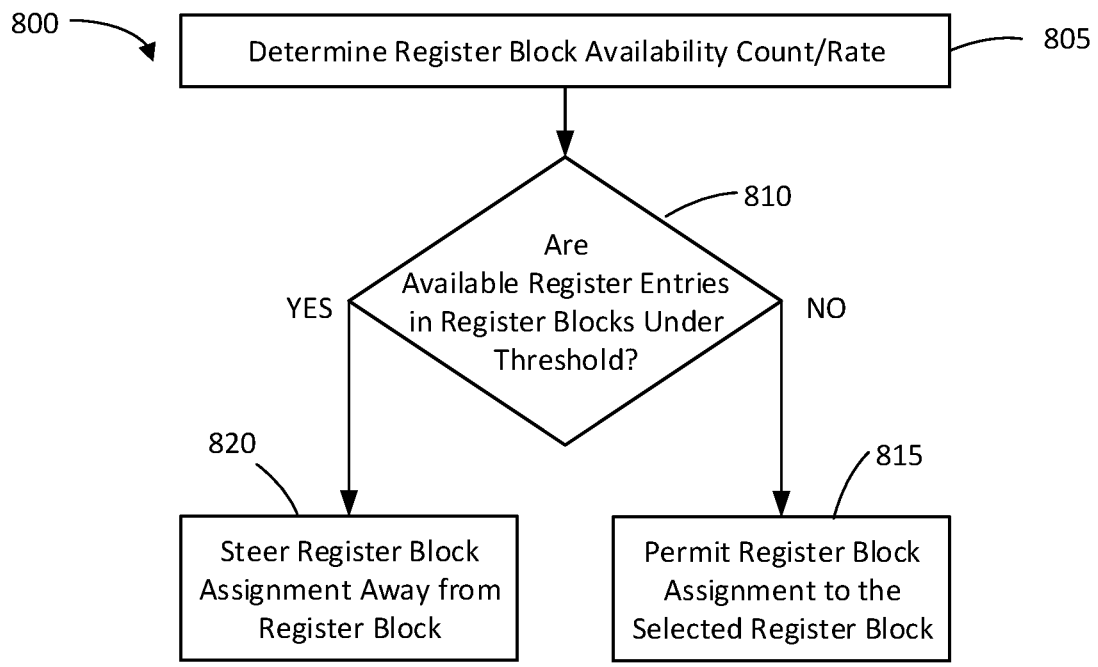
FIG. 8 illustrates a flow chart of a method according to an embodiment for processing and/or routing instructions in a processor, including in an aspect assigning destination register blocks.

It can be appreciated that the adjustment of the destination register blocks to which the results of an instruction are written can be implemented in various embodiments. For example, FIG. 8 is an exemplary overview flowchart in accordance with an embodiment illustrating and describing a method 800 of assigning the register block destination of an instruction in a processor, and, in an embodiment, reassigning (rename) register blocks to instructions to be processed in a manner where the results are written to a different destination (rename) register block to potentially improve processor latency. While the method 800 is described for the sake of convenience and not with an intent of limiting the disclosure as comprising a series and/or a number of steps, it is to be understood that the process 800 does not need to be performed as a series of steps and/or the steps do not need to be performed in the order shown and described with respect to FIG. 8, but the process 800 may be integrated and/or one or more steps may be performed together, simultaneously, or the steps may be performed in the order disclosed or in an alternate order.

At 805 the register block availability count and/or rate for each register block in the register file is determined, and at 810 it is determined and/or calculated whether the register entries available in each register block are under a threshold. For each register block where the available number of register entries are not below (e.g., are equal to or above) the threshold (810: No), indicating, for example, that the destination register block is not over-utilized, then the process continues to 815 where the destination register block assignment is retained and/or permitted. In other words, instructions that are assigned during normal dispatch logic to a preferred destination register block, that preferred destination register block assignment is permitted, used, and/or retained. For each destination register block where the available number of register entries are below the threshold (810: Yes), indicating, for example, that the destination register block is being over-utilized, then the process continues to 820 where the register block assignment is steered away from the register block that is under the threshold. In other words, instructions that can be assigned to one or more destination register block(s), are assigned to the destination register blocks that are not under the threshold and destination register blocks under the threshold are avoided.

In an example embodiment, in the pre-dispatch stage 0 (524) when the issue unit 235 (and Issue Queue (ISQ) 536) is being selected and/or assigned, the availability of the destination register block as determined in process 800 can be used in selecting and assigning the Issue Unit 235 and/or Issue Queue (ISQ) 536. For example, dispatch logic can have a preferred ISQ and execution unit to execute an instruction, which will write the results to a preferred destination register block, and if the number of available register entries in the preferred destination register block is under the threshold, then the instruction can be assigned and routed to an issue unit (e.g., an Issue Queue) that feeds (e.g., writes to) a different destination register block (other than the preferred destination register block), and if the number of available entries in the register block is over the threshold, then the instruction can be assigned and routed to the issue unit (e.g., an Issue Queue) that feeds (e.g., writes to) the selected and/or preferred destination register block. Alternatively, during the pre-dispatch stage 0 (524) the fullness of the destination register blocks are not taken into consideration when making the ISQ assignment decision, and during pre-dispatch stage 1 (526) when the destination register bank is being selected and/or assigned, the availability of a destination register block as determined in process 800 can be used in selecting and/or assigning the destination register bank for that instruction. In other words, if the number of available register entries in a preferred destination register block is over (e.g., not under) the threshold, then the preferred destination register block can be selected and assigned as the destination register block and the instruction results will be routed to that preferred destination register block, and if the number of register entries available in the preferred destination register block is under the threshold, then the destination register block for the instruction will be steered away from that preferred destination register block which is over the threshold (e.g., assigned and routed to a different destination register block). That is, in an embodiment, the destination register block fullness is not taken into consideration when selecting the Issue Unit and/or Issue Queue (ISQ) during pre-dispatch stage 0, but the fullness of the destination register block is taken into consideration during pre-dispatch stage 1 to balance the rename register blocks afterward.

Figure 9:
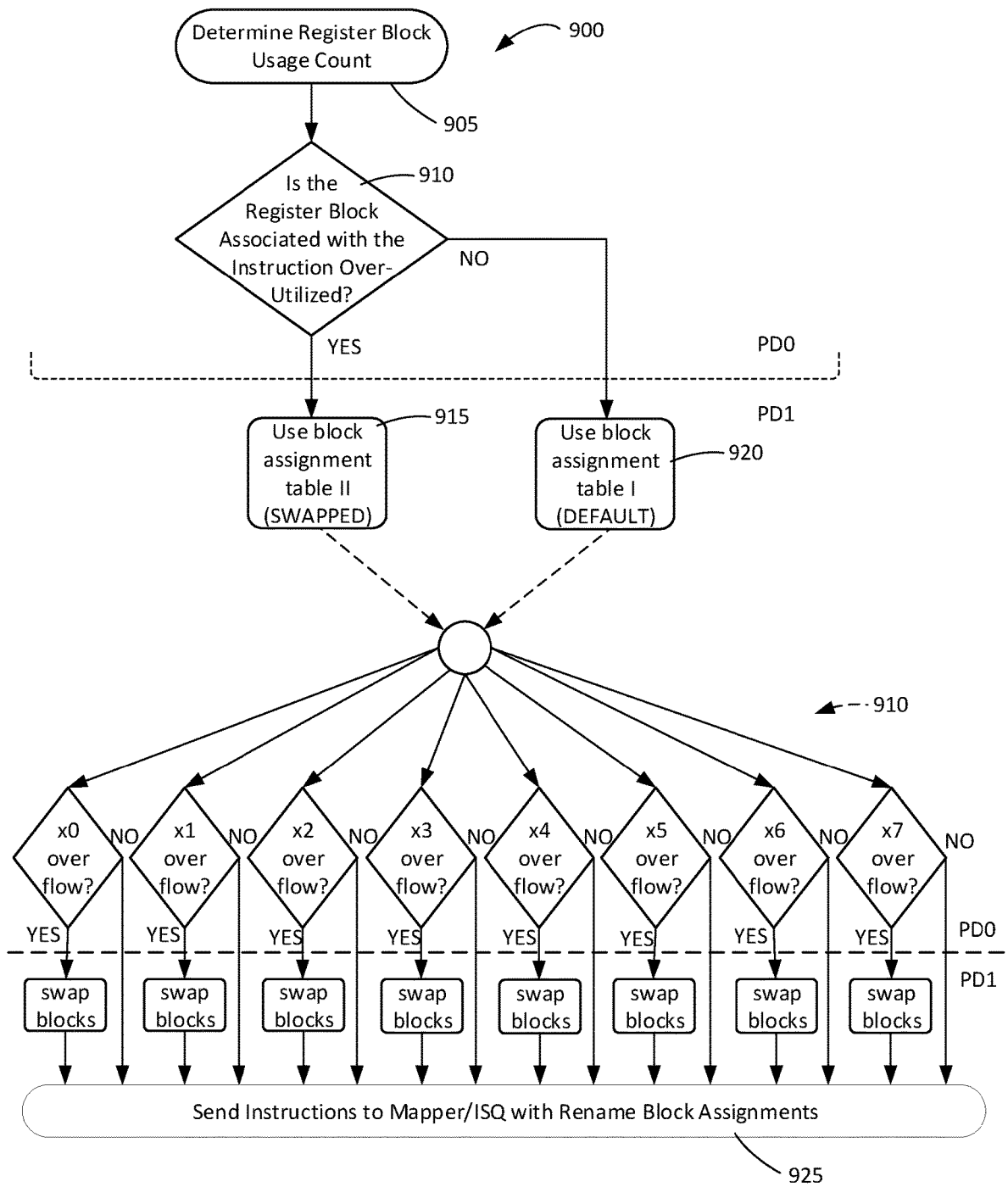
FIG. 9 illustrates a flow chart of a method according to an embodiment of routing instructions in a processor, including in an aspect adjusting the assignment of destination register blocks.

FIG. 9 is an exemplary overview flowchart in accordance with another embodiment illustrating and describing a method 900 of assigning (and/or reassigning) destination (rename) register blocks to instructions in a processor, and, in an embodiment, reassigning the destination (rename) register block to the instruction to be processed in a manner where the results are written to a different destination (rename) register block to potentially improve processor latency. While the method 900 is described for the sake of convenience and not with an intent of limiting the disclosure as comprising a series and/or a number of steps, it is to be understood that the process 900 does not need to be performed as a series of steps and/or the steps do not need to be performed in the order shown and described with respect to FIG. 9, but the process 900 may be integrated and/or one or more steps may be performed together, simultaneously, or the steps may be performed in the order disclosed or in an alternate order.

In process 900, the register block associated and initially assigned to an instruction is checked later in the routing decision process, and if a register bank is going to be overrun (e.g., is overutilized), then register blocks will be swapped. In one or more embodiments, the register block assignments are left intact or can be swapped according to a table of assignments. At 905 in process 900, the register block usage count is determined. The register block usage count can be determined in a number of different ways, including, but not limited to, the several embodiments discussed in connection with 705 in process 700, and/or the embodiments discussed in connection with 805 in process 800.

At 910 it is determined whether the destination register block associated with an instruction is over utilized. That is, in an embodiment the instruction has already been associated with (e.g., assigned to) a destination register block through normal processing, and at 910 it is determined whether the destination register block initially associated with and/or assigned to the instruction is overutilized. Determining whether a destination register block associated with and/or assigned to an instruction is over utilized can be determined and/or calculated in a number of different ways, including the embodiments discussed in connection with 710 in process 700, and/or the embodiments discussed in connection with 810 in process 800. As other examples, over-utilization can be defined according to whether the number of available or used entries in a register block is over or under a threshold. In other embodiments, over-utilization can be determined by determining whether there is any room (any available entry) in a destination (rename) register block. In other words, in an example, a destination (rename) register block is determined to be over-utilized if there are not any available entries in the destination (rename) register block, and more specifically is determined to be over-utilized only if there is not one available entry in the destination (rename) register block.

One of skill in the art can appreciate that the number of register entries available for use or that are being used in a register block can both be used to measure the utilization or "fullness" of a register block. In the present disclosure various counters and means to determine the usage or availability of a register block have been disclosed, from which the utilization of the register block can be calculated as the number of entries in a register block is generally known or determinable. The information on the count of the register entries per register block is maintained in one or more embodiments in count pool 425 in the Dispatch Unit 220. In process 900, the calculation of the utilization count and/or rate of the register blocks can be performed in the dispatch stage of processing the instruction, and in an embodiment is preferably calculated/determined at the pre-dispatch (cycle) stage 0 (524).

If at 910 it is determined that the destination register block associated with (e.g., initial assigned to) the instruction is overutilized (910: Yes), then at 915 the destination register block assignments are changed, and in an embodiment are swapped according to a table. For example, each instruction type can be correlated to particular destination register block as per a default (preferred) table of assignments, and each instruction type can also be correlated to a different particular destination register block as per a swapped table of assignments. For example, a swappable load instruction can be assigned to block 0 in default table I and can be assigned to block 2 in swap table II. It will be appreciated that not all instruction types may be capable of being swapped to a different register block so such an instruction type will be assigned to the same register block in both tables. In the process 900, if a destination register block assigned to an instruction is overutilized (910: Yes), then at 915 the destination register block to which the instruction is assigned is swapped according to the instruction type as provided by swap table II. After 915, the process continues to 925 where the instructions are sent to the Mapper and Issue Unit (e.g., Issue Queue) with the register block assignment as per swap table II. The swapping and/or reassignment of the destination register block preferably takes place at the pre-dispatch stage 1 (526).

If at 910 it is determined that the register block associated with (e.g., initial assigned to) the instruction is not overutilized (910: No), then at 920 the register block assignments remain (e.g., the default/preferred register block assignment table I is used) and the process continues to 925 where the instructions are sent to the Mapper/Issue Unit with the register block assignment as per default table I.

In an embodiment, once you start swapping which destination register block (which write port for the register file to use) to use for an instruction type (e.g., a load instruction), it is preferred to swap all the destination register blocks to use for that instruction type. Changing and/or swapping the register blocks can potentially avoid writeback collisions. In an approach, once the utilization rate drops below the threshold, destination register block assignments for all the instructions in the dispatch group are swapped until the utilization rate climbs above the threshold. In a preferred embodiment, this threshold check is made every cycle, so all instructions dispatched together in the same cycle will initially either be all swapped or all not swapped.

While the illustrative embodiments described above are preferably implemented in hardware, such as in units and circuitry of a processor, various aspects of the illustrative embodiments may be implemented in software as well. For example, it will be understood that each block of the flowchart illustrated in FIGS. 6-9, and combinations of blocks in the flowchart illustration, can be implemented by computer program instructions. These computer program instructions may be provided to a processor or other programmable data processing apparatus to produce a machine, such that the instructions that execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations in FIGS. 6-9 support combinations of means for performing the specified functions, combinations of steps for performing the specified functions and program instruction means for performing the specified functions. It will also be understood that each block of the flowchart illustration, and combinations of blocks in the flowchart illustrations, can be implemented by special purpose hardware-based computer systems that perform the specified functions or steps, or by combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for routing a plurality of instructions in a processor, the method comprising:
    providing a processing pipeline having two or more execution units configured to process the plurality of instructions;
    providing a register file having a plurality of register file entries configured to hold data, wherein the register file is subdivided into a plurality of register blocks, and each register block has two or more register file entries;
    associating an initial register block from the plurality of register blocks with a first instruction without using a utilization rate for the initial register block associated with the first instruction;
    calculating a utilization rate for one or more of the plurality of register blocks including calculating the utilization rate for the initial register block associated with the first instruction;
    checking, using the utilization rate for the initial register block associated with the first instruction, the initial register block associated with the first instruction;
    assigning, in response to the initial register block associated with the first instruction being over-utilized, a different, second register block of the plurality of register blocks to the first instruction;
    assigning, in response to the initial register block associated with the first instruction not being over-utilized, the initial register block associated with the first instruction; and
    routing the first instruction to write its result to the assigned register block of the plurality of register blocks based upon the utilization rate calculated for the initial register block.

2. The method according to claim 1, wherein calculating the utilization rate for the one or more of the plurality of register blocks comprises:
    determining a usage rate for each of the one or more of the plurality of register blocks; and
    comparing the usage rate of each of the one or more of the plurality of register blocks to a threshold.

3. The method according to claim 2, wherein the threshold is at least one of a group consisting of: a fixed number or percentage, a preset number or percentage, a predetermined number or percentage, a predefined number or percentage, an adjustable number or percentage, and a programmable number or percentage.

4. The method according to claim 2, wherein determining a usage rate for each of the one or more of the plurality of register blocks comprises determining at least one of a group consisting of: a number of register entries in use in the register block, a number of register entries that are not being used and are available for use in the register block, a percentage of register entries in use in the register block, and a percentage of register entries not in use in the register block.

5. The method according to claim 1, wherein routing the first instruction to write its result to the assigned register block of the one or more of the plurality of register blocks based upon the utilization rate calculated for the initial register block comprises:
    routing the first instruction to the initial register block if the utilization rate for the initial register block is equal to or less than a number or percentage; and
    routing the first instruction to the second register block if the utilization rate for the initial register block is above the number or the percentage.

6. The method according to claim 1, wherein each execution unit is configured to write its results to a single specific register block.

7. The method according to claim 1, further comprising:
    comparing the utilization rate calculated for the initial register block associated with the first instruction to a threshold, and if the utilization rate for the initial register block associated with the first instruction is over the threshold, then the initial register block associated with the first instruction is over-utilized.

8. The method according to claim 1, wherein:
    assigning the initial register block associated with the first instruction comprises keeping the initial register block associated with the first instruction according to a default table, and
    assigning the second register block to the first instruction comprises swapping the initial register block associated with the first instruction according to a swap table.

9. A processor for processing a plurality of instructions, the processor comprising:
    at least one processing pipeline having a plurality of execution units configured to execute the plurality of instructions;
    a register file having a plurality of register file entries configured to hold data, the register file sub-divided into a plurality of register blocks, each register block having at least two register file entries, wherein each register block is configured to receive results from a specific execution unit; and
    an instruction dispatch circuit unit configured to select which one of the plurality of register blocks is to receive the results from executing each of the plurality of instructions,
    wherein the processor is configured to:
    initially associate a specific register block from the plurality of register blocks with a first instruction based upon a preferred execution unit to execute the first instruction;
    calculate a utilization rate for the specific register block initially associated with the first instruction;
    check whether the specific register block initially associated with the first instruction is being over-utilized;
    assign, in response to the specific register block initially associated with the first instruction being over-utilized, the first instruction to a second register block that is different than the specific register block initially associated with the first instruction; and dispatch the first instruction to an issue queue with the second register block assigned to the first instruction.

10. The processor according to claim 9, wherein the processor is further configured to:

assign the first instruction, in response to the specific register block initially associated with the first instruction not being over-utilized, to the specific register block initially associated with the first instruction.

11. The processor according to claim 9, wherein the processor is further configured to:

have a first default table of register block assignments by instruction type and have at least a second swap table of register block assignments by instruction type, wherein the first instruction is initially associated with the specific register block according to the first default table, and in response to the specific register block initially associated with the first instruction not being over-utilized, maintain the specific register block initially associated with the first instruction according to the first default table; and in response to the specific register block initially associated with the first instruction being over-utilized, swap the specific register block initially associated with the first instruction according to the second swap table.

12. The processor according to claim 9, wherein the processor is further configured to:

calculate a utilization rate for each of the plurality of register blocks, including a utilization rate of the second register block; and assign, based upon the utilization rate calculated for each of the plurality of register blocks, the second register block to receive a result from executing the first instruction based upon the utilization rate of the second register block.

13. The processor according to claim 9, wherein the dispatch circuit has a counter for each of the plurality of register blocks to track the number of register file entries in the respective register block that are in use or available for use.

14. The processor according to claim 9, wherein the processor is further configured to:

assign the first instruction an issue queue to receive the first instruction in a first stage of the dispatch circuit;

assign a given register block to receive a result from executing the first instruction in a second stage of the dispatch circuit; and assign a register file entry in the given register block to receive the result from executing the first instruction in a mapper.

15. A processor for processing a plurality of instructions, the processor comprising:

at least one processing pipeline having:

a plurality of execution units configured to execute the plurality of instructions;

an issue queue to hold the plurality of instructions for release to the plurality of execution units;

a register file having a plurality of register file entries configured to hold data, the register file sub-divided into a plurality of register blocks, each register block having at least two register file entries, wherein each register block is configured to receive results from a specific execution unit from the plurality of execution units; and an instruction dispatch circuit configured to select the issue queue to hold each particular instruction for execution, wherein the dispatch circuit comprises a counter to determine, for each register block, one of a number of available or in use register file entries in that register block, wherein the dispatch circuit is configured to:

preliminarily associate a specific register block with a first instruction based upon a preferred execution unit to execute the first instruction;

determine, using the counter for the specific register block preliminarily associated with the first instruction, whether the specific register block preliminarily associated with the first instruction is over-utilized;

assign, in response to the specific register block preliminarily associated with the first instruction being over-utilized, a second register block to the first instruction that is different than the specific register block preliminarily associated with the first instruction; and assign, in response to the specific register block preliminarily associated with the first instruction not being over-utilized, the specific register block preliminarily associated with the first instruction; and wherein the processor is configured to:

route the first instruction with its assigned register block to the issue queue and a mapper.

* * * * *